US008562735B2

(12) United States Patent
Allouche et al.

(10) Patent No.: US 8,562,735 B2
(45) Date of Patent: Oct. 22, 2013

(54) INCINERATOR FLY ASH GEOPOLYMER AND METHOD

(75) Inventors: Erez Nissim Allouche, Madison, MS (US); Eleazar Ivan Diaz-Loya, Parkville, MD (US)

(73) Assignee: Louisiana Tech University Research Foundation, a division of Louisiana Tech University Founcation, Inc., Ruston, LA (US)

( * ) Notice: Subject to any disclaimer, the term of this patent is extended or adjusted under 35 U.S.C. 154(b) by 0 days.

(21) Appl. No.: 13/594,164

(22) Filed: Aug. 24, 2012

(65) Prior Publication Data

US 2013/0061776 A1 Mar. 14, 2013

Related U.S. Application Data (60) Provisional application No. 61/528,230, filed on Aug. 27, 2011.

(51) Int. Cl.
C04B 18/04 (2006.01)
C04B 18/06 (2006.01)
C04B 18/10 (2006.01)

(52) U.S. Cl.
USPC ............ 106/705; 106/624; 106/707; 106/708

(58) Field of Classification Search
USPC ................... 106/705, 707, 624, 708
See application file for complete search history.

(56) References Cited

U.S. PATENT DOCUMENTS

| | | | | |
|---|---|---|---|---|
| 3,852,084 | A * | 12/1974 | Webster et al. | 106/710 |
| 3,854,965 | A * | 12/1974 | Niwa et al. | 501/153 |
| 4,226,630 | A | 10/1980 | Styron | |
| 4,696,699 | A | 9/1987 | Harriett | |
| 5,490,889 | A * | 2/1996 | Kirkpatrick et al. | 106/709 |
| 5,810,920 | A | 9/1998 | Ueshima et al. | |
| 5,810,922 | A * | 9/1998 | Okamoto et al. | 106/714 |
| 6,334,895 | B1 * | 1/2002 | Bland | 106/705 |
| 6,517,631 | B1 * | 2/2003 | Bland | 106/705 |
| 6,632,876 | B2 | 10/2003 | Soukatchoff | |
| 7,347,896 | B2 | 3/2008 | Harrison | |
| 7,846,250 | B2 * | 12/2010 | Barlet-Gouedard et al. | 106/600 |
| 8,038,789 | B2 * | 10/2011 | Boxley | 106/672 |
| 2002/0144631 | A1 * | 10/2002 | Bland | 106/705 |
| 2003/0188668 | A1 * | 10/2003 | Bland | 106/705 |
| 2005/0016418 | A1 | 1/2005 | Holbek | |
| 2009/0250660 | A1 * | 10/2009 | Nayak et al. | 252/182.32 |
| 2010/0058957 | A1 * | 3/2010 | Boxley | 106/709 |
| 2011/0232532 | A1 * | 9/2011 | Ramme et al. | 106/624 |
| 2012/0152153 | A1 * | 6/2012 | Gong et al. | 106/705 |

FOREIGN PATENT DOCUMENTS

| | | | |
|---|---|---|---|
| EP | 1801084 A1 | * | 6/2007 |
| JP | 08217501 A | * | 8/1996 |
| JP | 2008239446 A | * | 10/2008 |
| JP | 2011157253 A | * | 8/2011 |

OTHER PUBLICATIONS

U.S. Appl. No. 12/972,722, "Geopolymer Mortar and Method," Erez Allouche and Carlos Montes, filed Dec. 20, 2010 (co-pending application).
U.S. Appl. No. 13/289,705, "Cured-In-Place-Pipe Liner Inspection System and Method," Erez Allouche and Shaurav Alam, filed Nov. 4, 2011 (co-pending application).
U.S. Appl. No. 13/481,494, "Method for Geopolymer Concrete," Erez Nissim Allouche and Eleazar Ivan Diaz-Loya, filed May 25, 2012 (co-pending application).
PCT International Searching Authority/US, International Search Report, mailed Apr. 20, 2012, for PCT/US2011/65854, "Geopolymer Mortar and Method" (related to co-pending application).
PCT International Searching Authority/US, Written Opinion of the International Searching Authority, mailed Apr. 20, 2012, for PCT/US2011/65854, "Geopolymer Mortar and Method" (related to co-pending application).
Yunsheng, Z., Wei, S., Qianli, C., and Lin, C., Synthesis and heavy metal immobilization behaviors of slag based geopolymer, Journal of Hazardous Materials 143, 206-213 (2007).

* cited by examiner

*Primary Examiner* — Anthony J Green
(74) *Attorney, Agent, or Firm* — Jones Walker LLP (57) ABSTRACT

A geopolymer concrete formed by mixing about 3% to about 43% by weight incinerator fly ash, about 3% to about 35% by weight coal fly ash, about 7% to about 38% by weight alkaline activator liquid, and about 31% to about 70% by weight aggregate. The incinerator fly ash may be derived from a solid waste incinerator facility. The alkaline activator liquid may include a sodium hydroxide solution and sodium silicate. The aggregate may include a fine aggregate, such as sand, and a coarse aggregate, such as gravel.

11 Claims, 6 Drawing Sheets

INCINERATOR FLY ASH GEOPOLYMER AND METHOD

CROSS-REFERENCE TO RELATED PATENT APPLICATION

This application claims priority to U.S. Provisional Application No. 61/528,230, filed on Aug. 27, 2011, which is incorporated herein by reference.

SUMMARY OF SELECTED EMBODIMENTS OF INVENTION

A composition of matter formed by the mixing of the components including: about 19% to about 43% by weight incinerator fly ash; about 7% to about 38% by weight alkaline activator liquid; and about 31 to about 70% by weight aggregate. The incinerator fly ash may be derived from a solid waste incinerator facility.

In another embodiment, a composition of matter is formed by the mixing of the components including: about 3% to about 43% by weight incinerator fly ash; about 3% to about 35% by weight coal fly ash; about 7% to about 38% by weight alkaline activator liquid; and about 31% to about 70% by weight aggregate. Alternatively, in a further embodiment, the composition of matter comprises: about 4% to about 25% by weight incinerator fly ash; about 4% to about 20% by weight coal fly ash; about 12% to about 19% by weight alkaline activator liquid; and about 58% to about 63% by weight aggregate. The incinerator fly ash may be derived from a solid waste incinerator facility. The weight ratio of the incinerator fly ash to the coal fly ash in the composition of matter may be in the range of about 0.25 to about 4. The alkaline activator liquid may include a sodium hydroxide solution and a sodium silicate. The concentration of sodium hydroxide in the sodium hydroxide solution may be in the range of about 6 M to about 14M. Preferably, the concentration of sodium hydroxide in the sodium hydroxide solution may be in the range of about 12 M to about 14 M. More preferably, the concentration of sodium hydroxide in the sodium hydroxide solution may be about 14 M. The concentration of the sodium silicate in the alkaline activator liquid may be in the range of about 34% to about 46% by weight. Preferably, the concentration of the sodium silicate in the alkaline activator liquid may be in the range of about 44% to about 46% by weight. More preferably, the concentration of the sodium silicate in the alkaline activator liquid may be about 45% by weight. A ratio of the sodium hydroxide solution to the sodium silicate in the alkaline activator liquid may be in the range of about 0.4 to about 1. Preferably, the ratio of the sodium hydroxide solution to the sodium silicate in the alkaline activator liquid may be in the range of about 0.8 to about 1. More preferably, the ratio of the sodium hydroxide solution to the sodium silicate in the alkaline activator liquid may be about 1. The $SiO_2$ to $Na_2O$ ratio of the sodium silicate may be in the range of about 1.6 to about 3.2. Preferably, the $SiO_2$ to $Na_2O$ ratio of the sodium silicate may be in the range of about 1.8 to about 2.2. More preferably, the $SiO_2$ to $Na_2O$ ratio of the sodium silicate may be about 2. The aggregate may include a fine aggregate, which may be a well-graded sand. The aggregate may further include a coarse aggregate. The coarse aggregate may include gravel with a diameter of approximately one centimeter. The fine aggregate to coarse aggregate weight ratio may be about 1 to about 4. Preferably, the fine aggregate to coarse aggregate weight ratio may be about 1 to about 3. More preferably, the fine aggregate to coarse aggregate weight ratio may be about 2. The composition of matter may further include a water reducing agent, which may be a polycarboxylate-based water reducing agent.

A method for decreasing the toxicity of incinerator fly ash, the method including activating the incinerator fly ash with an alkaline activator liquid to form a geopolymer. The alkaline activator liquid may be added in a weight ratio of alkaline activator liquid to incinerator fly ash of approximately 0.3 to approximately 1.2.

A method for decreasing the toxicity of incinerator fly ash, the method including: (a) mixing the incinerator fly ash with a sodium hydroxide solution for about 30 seconds, wherein a weight ratio of the sodium hydroxide solution to the incinerator fly ash is in the range of approximately 0.08 to approximately 0.6; (b) adding a sodium silicate to the mixture and further mixing the mixture for about 30 seconds, wherein a weight ratio of the sodium silicate to the sodium hydroxide solution is in the range of approximately 1 to approximately 2.5; and (c) adding a fine aggregate to the mixture and further mixing the mixture for about 30 seconds, wherein a weight ratio of the fine aggregate to the incinerator fly ash is in the range of approximately 0.5 to approximately 2.4. The fine aggregate may be a well-graded sand. The method may further include adding a coarse aggregate to the mixture and further mixing the mixture for about 90 to 120 seconds, wherein a weight ratio of the fine aggregate to the coarse aggregate is in the range of approximately 1 to approximately 4. The coarse aggregate may be gravel with a diameter of approximately one centimeter. Preferably, the weight ratio of the sodium hydroxide solution to the incinerator fly ash is in the range of approximately 0.2 to approximately 0.5, the weight ratio of the sodium silicate to the sodium hydroxide solution is in the range of approximately 1 to approximately 1.25, the weight ratio of the fine aggregate to the incinerator fly ash is in the range of approximately 1.2 to approximately 1.9, and the weight ratio of the fine aggregate to the coarse aggregate is in the range of approximately 1 to approximately 3. More preferably, the weight ratio of the sodium silicate to the sodium hydroxide solution is approximately 1, the weight ratio of the fine aggregate to the incinerator fly ash is approximately 1.7, and the weight ratio of the fine aggregate to the coarse aggregate is approximately 2.

A method for decreasing the toxicity of incinerator fly ash, the method including: (a) mixing the incinerator fly ash with a coal fly ash in a weight ratio of incinerator fly ash to coal fly ash in the range of approximately 0.25 to approximately 4.0 to form a fly ash mixture; and (b) activating the fly ash mixture with an alkaline activator liquid to form a geopolymer, wherein the alkaline activator liquid is added in a weight ratio of alkaline activator liquid to fly ash mixture in the range of approximately 0.3 to approximately 1.2. Preferably, the weight ratio of the alkaline activator liquid to fly ash mixture is in the range of approximately 0.5 to approximately 0.8. Before step (a), the incinerator fly ash may be dried to remove humidity and grinded until approximately 60% of particles of the incinerator fly ash are smaller than 45 microns. Step (b) of the method may further include: (i) adding a sodium hydroxide solution of the alkaline activator liquid to the fly ash mixture and further mixing the mixture for about 30 seconds, wherein a weight ratio of the sodium hydroxide solution to the fly ash mixture is in the range of approximately 0.08 to approximately 0.6; and (ii) adding a sodium silicate of the alkaline activator liquid to the mixture and further mixing the mixture for about 30 seconds, wherein a weight ratio of the sodium silicate to the sodium hydroxide solution is in the range of approximately 1 to approximately 2.5. Preferably, the weight ratio of the sodium hydroxide solution to the fly ash mixture is in the range of approximately 0.2 to approximately 0.5, and the weight ratio of the sodium silicate to the sodium hydroxide solution is in the range of approximately 1 to approximately 1.25. More preferably, the weight ratio of the sodium silicate to the sodium hydroxide solution is approximately 1.

The method may further include: (c) adding a fine aggregate to the mixture and further mixing the mixture for about 30 seconds to form a geopolymer solid paste, wherein a weight ratio of the fine aggregate to the fly ash mixture is in the range of approximately 0.5 to approximately 2.4. Preferably, the weight ratio of the fine aggregate to the fly ash mixture may be in the range of approximately 1.2 to approximately 1.9. The fine aggregate may be a well-graded sand. The method may further include: (c1) adding a coarse aggregate to the mixture and further mixing the mixture for about 90 to about 120 seconds to form a geopolymer solid paste, wherein a weight ratio of the fine aggregate to the coarse aggregate is in the range of approximately 1 to approximately 4. Preferably, the weight ratio of the fine aggregate to the coarse aggregate may be in the range of approximately 1 to approximately 3. More preferably, the weight ratio of the fine aggregate to the coarse aggregate may be approximately 2. The coarse aggregate may be a gravel with a diameter of approximately one centimeter.

The method may further include: (d) curing the geopolymer solid paste at a temperature in the range of approximately 21 to approximately 100 degrees Celsius for a time period in the range of one to seven days to form a geopolymer concrete. Preferably, the curing temperature may be approximately 100 degrees Celsius, and the curing time period may be approximately three days. Alternatively, the geopolymer solid paste may be maintained at room temperature for a time period in the range of approximately one hour to approximately three days before the geopolymer solid paste is cured. Preferably, this time period may be approximately 24 hours. The method may further comprise: (e) cooling the geopolymer concrete at room temperature for a time period in the range of approximately 1 hour to approximately 24 hours. Preferably, the time period may be approximately 24 hours. The geopolymer concrete may have a compressive strength in the range of approximately 10 to approximately 34 MPa.

BACKGROUND

Municipal solid waste incineration is a common and effective method of reducing the volume of solid waste while recovering energy. The byproduct of the incineration process is an incinerator fly ash, in which several volatile metals and organic compounds (e.g., dioxins and furans) are concentrated. Incinerator fly ash that is part of a waste stream captured from flue gas by pollution control devices usually has higher toxicity levels than incinerator fly ash collected at the bottom of a combustion chamber. The incinerator fly ash is classified as a hazardous waste because the heavy metals and other toxic compounds found in the incinerator fly ash may be easily leached into the ground or released into the atmosphere. This poses a potential health and environmental danger.

Geopolymers are synthesized from source materials that are rich in silica and alumina, such as coal fly ash. Geopolymers result from a chemical reaction where the silica and alumina molecules from the source materials react under highly alkaline conditions. The outcome of the reaction is an amorphous 3D network of Si and Al atoms linked by O atoms in a four-fold coordination similar to the one exhibited by zeolites. The positive ion ($Na^+$ or $K^+$) provided by the activator solution serves to balance the negative charge generated by having $Al^{3+}$ atoms in a four-fold coordination. It has been reported that heavy metals may become encapsulated and immobilized within the geopolymer 3D network. While the mechanism by which heavy metal immobilization occurs is not yet fully understood, it has been proposed that initially metal ions are taken into the geopolymer network, subsequently they are bound into the structure in charge-balancing roles and finally, the remaining metal ions are physically encapsulated in the binder.

BRIEF DESCRIPTION OF THE SEVERAL VIEWS OF THE DRAWINGS

FIG. 6(*a*) is SEM images of a coal fly ash sample before and after the alkaline activation process.

FIG. 6(*b*) is SEM images of a fly ash mixture containing 60% incinerator fly ash and 40% coal fly ash before and after the alkaline activation process.

FIG. 6(*c*) is SEM images of an incinerator fly ash sample before and after the alkaline activation process.

DETAILED DESCRIPTION OF SELECTED EMBODIMENTS OF THE INVENTION

Incinerator fly ash may be mixed with coal fly ash and activated with an alkaline solution to form a geopolymer concrete having a lower leachability of most heavy metals and toxic compounds than in the incinerator fly ash. Heavy metals of the incinerator fly ash may be immobilized and encapsulated within the geopolymer 3D network. It has been proposed that a portion of the heavy metal ions are bound into the geopolymer network in charge-balancing positions and the remaining metal ions are physically encapsulated in the geopolymer. Also, use of limestone during the incineration process leaves behind vast quantities of calcium oxide, which enables the incinerator fly ash to be activated and stabilized with an alkaline activator liquid. The addition of coal fly ash to the process increases the strength of the binder and reduces the leachability of the contaminants.

The incinerator fly ash may be obtained from a "Waste-To-Energy" incinerator facility or a similar incinerator facility. The coal fly ash may be class F fly ash according to ASTM C 618 obtained from Dolet Hills Power Plant located in Louisiana, United States. Alternatively, the coal fly ash may be any commercially available Class C or Class F fly ash. The proportions of fly ash in a fly ash mixture used to create the geopolymer concrete may be 80% incinerator fly ash and 20% coal fly ash, 60% incinerator fly ash and 40% coal fly ash, 40% incinerator fly ash and 60% coal fly ash, or 20% incinerator fly ash and 80% coal fly ash. These percentages are based on weight. Before mixing with coal fly ash, the incinerator fly ash may be processed to remove humidity and to grind the fly ash such that approximately 60% of the incinerator fly ash particles are smaller than 45 microns.

After mixing the incinerator fly ash and the coal fly ash into the fly ash mixture, an alkaline activator liquid may be added to the fly ash mixture. The weight ratio of the alkaline activator liquid to the fly ash mixture may be in the range of 0.3 to 1.2. Preferably, this weight ratio may be in the range of 0.5 to 0.8.

The alkaline activator liquid may be made of a sodium hydroxide solution and sodium silicate. The sodium hydroxide solution may have a concentration in the range of 6M to 14M. Preferably, this concentration may be in the range of approximately 12M to approximately 14M. More preferably, this concentration may be approximately 14M. The sodium silicate may be in liquid form. Alternatively, the sodium silicate may in dry form, such as silicate powder, anhydrous sodium silicate 65 or hydrated G, which may be dissolved in wet compositions. The concentration of the sodium silicate in the alkaline activator liquid may be in the range of 34% to 46% by weight. Preferably, this concentration may be in the range of 44% to 46% by weight. More preferably, this concentration may be approximately 45% by weight. The weight ratio of $SiO_2$ to $Na_2O$ in the sodium silicate may be in the range of 1.6 to 3.22. Preferably, this weight ratio may be in the range of 1.8 to 2.2. More preferably, this weight ratio may be approximately 2. The weight ratio of sodium hydroxide solution to sodium silicate in the alkaline activator liquid may be in the range of 0.4 to 1. Preferably, this weight ratio may be in the range of 0.8 to 1. More preferably, this weight ratio may be approximately 1.

After activating the fly ash mixture with the alkaline activator liquid, an aggregate may be added to the mixture. The weight ratio of the aggregate to the fly ash mixture may be in the range of 1 to 3. Preferably, this weight ratio may be approximately 2.5. A fine aggregate and a coarse aggregate may be used with a fine aggregate to coarse aggregate weight ratio in the range of 1 to 4. Preferably, this weight ratio may be in the range of 1 to 3. More preferably, this weight ratio may be approximately 2. The fine aggregate may be a well graded sand, and the coarse aggregate may be a "pea gravel" with a diameter of approximately 1 cm. Alternatively, the aggregate may include only a fine aggregate, such as sand, without a coarse aggregate. A polycarboxylate-based water reducing agent may be added to the mixture to improve rheological properties of the mixture. The water reducing agent may be a superplasticizer sold by BASF Corp.

The fly ash mixture may be mixed with the sodium hydroxide solution of the alkaline activator liquid for 30 seconds. Next, the sodium silicate of the alkaline activator liquid may be added and mixed for 30 seconds. Next, the fine aggregate may be added and mixed for 60 seconds, and the coarse aggregate may be added and mixed for another 90 to 120 seconds. The water reducing agent may be added and mixed for 30 seconds. The geopolymer paste may be cast into a mold and cured for a time period in the range of one to seven days at a temperature of 21 to 100 degrees Celsius to enhance the formation of geopolymeric chains, thereby increasing the mechanical strength. Preferably, the geopolymer paste may be cured for a time period of approximately three days at a temperature of approximately 100 degrees Celsius. Alternatively, the geopolymer paste may remain in the mold for a time period in the range of one hour to three days, and preferably 24 hours, prior to curing. After curing, the geopolymer concrete may be cooled at room temperature for a time period in the range of 1 to 24 hours before use or testing. Preferably, the geopolymer concrete may be cooled at room temperature for a time period of approximately 24 hours. Alternatively, the geopolymer concrete may be used or tested immediately after curing without being cooled. If the fly ash mixture contains 80% incinerator fly ash and 20% coal fly ash, the geopolymer paste may have a faster setting time and the mixing times may be reduced to allow for casting and forming.

The resultant geopolymer concrete may also have a mechanical strength of up to 34 MPa and a reduced leachability level of most contaminants. Immobilization of the heavy metals in the geopolymer paste may reach up to 85% of chromium, 19% of arsenic, 25% of selenium, 72% of silver, 97% of cadmium, 83% of barium, 85% of mercury, and 50% of lead.

The resultant geopolymer concrete may be cast in the form of a cradle, brick, paving stone, or any other desirable geometry. The geopolymer concrete may be used in non-structural and semi-structural applications such as catch basins, distribution basins, drain boxes, manholes, parking stoppers, bicycle stands, stepping stones, and pipe cradles. The geopolymer concrete may also be used for semi-structural and structural precast elements such as railway sleepers, bridge concrete barriers, bricks, and slabs. This process may provide an efficient, cost-effective, and environmentally friendly solution to the disposal of incinerator fly ash by reducing its toxicity levels and allowing it to be re-classified as a non-hazardous material.

Experimental testing was performed on the fly ash mixtures, along with the geopolymer pastes and the geopolymer concrete samples formed using the alkaline activation process for each fly ash mixture, namely, the 80% incinerator fly and 20% coal fly ash sample, the 60% incinerator fly ash and 40% coal fly ash sample, the 40% incinerator fly ash and 60% coal fly ash sample, and the 20% incinerator fly ash and 80% coal fly ash sample. ASTM standard C192 was followed. For comparison, the same experimental testing was performed on 100% incinerator fly ash and 100% coal fly ash, along with the geopolymer pastes and geopolymer concrete samples formed using each fly ash sample. It is noted that incinerator fly ash alone is expected to produce low levels, if any, of geopolymeric chains due to the lack of silica and alumina.

Leaching Tests:

Leaching tests were performed on each fly ash sample, each geopolymer paste, and each resulting geopolymer concrete to determine the stability of heavy metals in each sample before and after geopolymerization. The leaching tests were performed according to the U.S. Environmental Protection Agency's toxicity leaching characteristic procedure to determine the mobility of chromium, selenium, arsenic, silver, cadmium, barium, mercury, and lead. The toxicity leaching characteristic procedure test simulates landfill conditions to determine the mobility of toxic contaminants and sets limits to determine whether the material under scrutiny is toxic.

Figure 1:
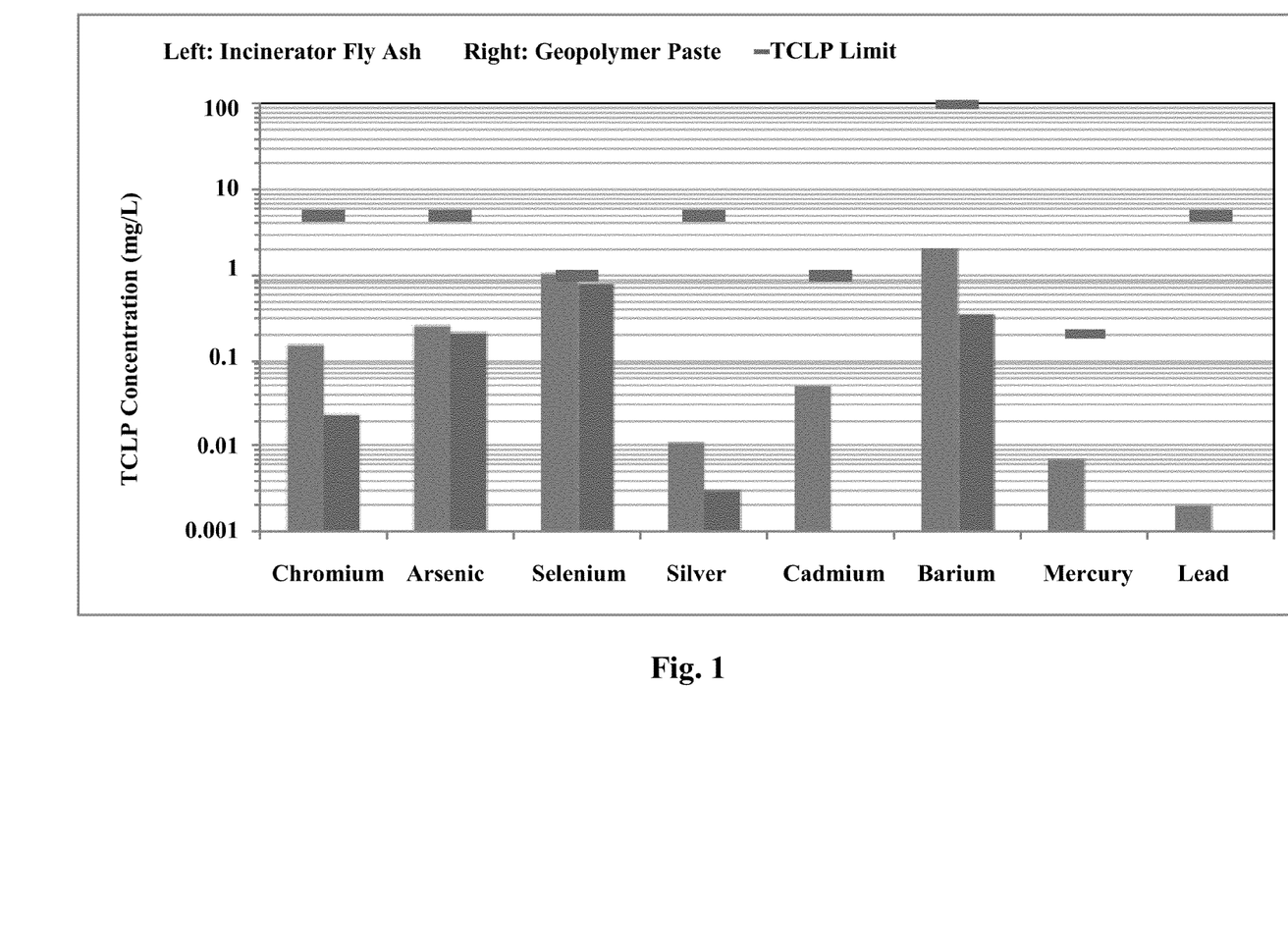
FIG. 1 is a graphical representation of toxicity leaching results for incinerator fly ash before and after the alkaline activation process.
Figure 2:
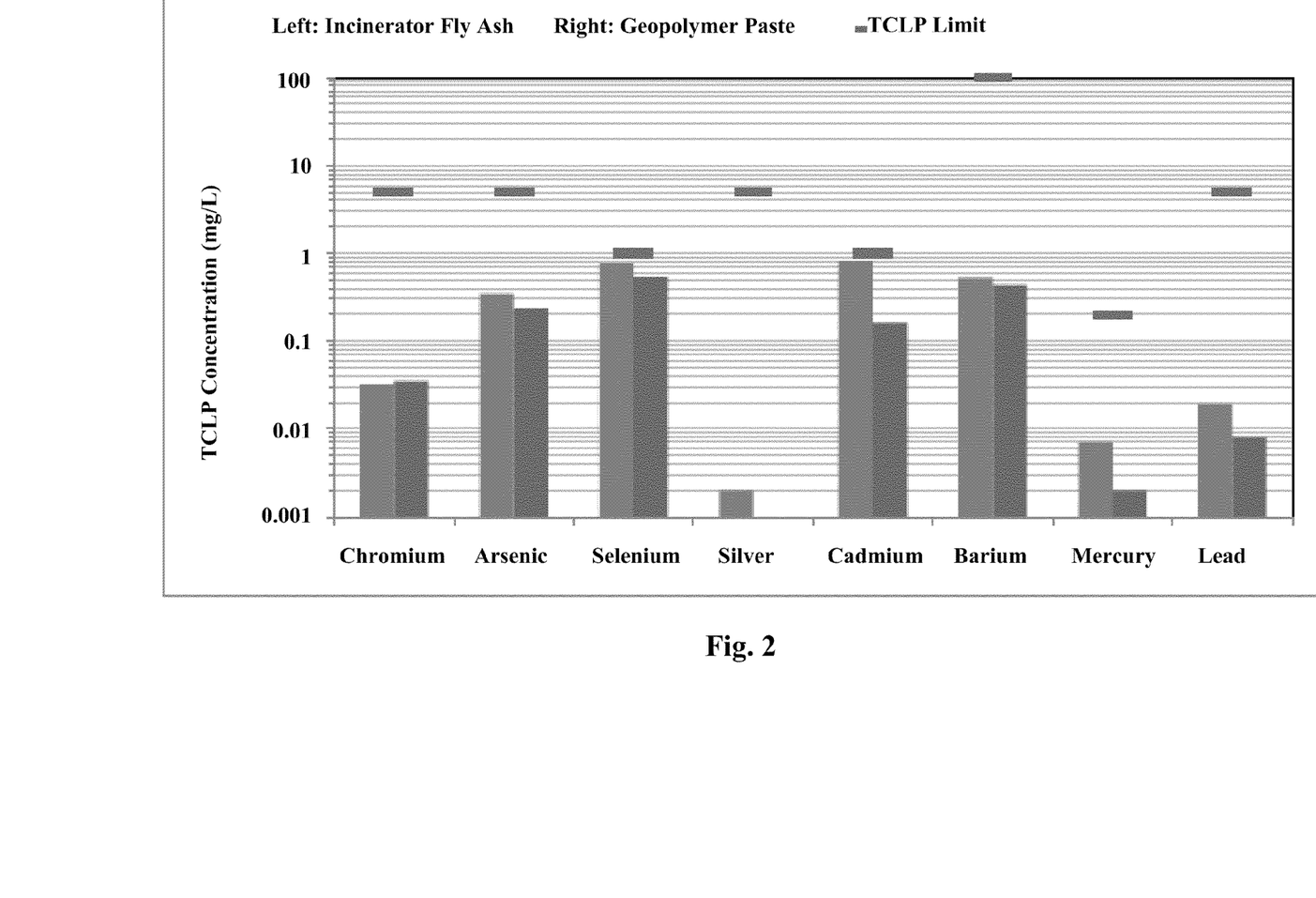
FIG. 2 is a graphical representation of toxicity leaching results for a fly ash mixture of 40% incinerator fly ash and 60% coal fly ash before and after the alkaline activation process.

FIG. 1 shows results of the EPA's toxicity leaching characteristic procedure for 100% incinerator fly ash before and after the alkaline activation process. The results displayed in FIG. 1 show that the alkaline activation process reduces the leachability of incinerator fly ash. FIG. 2 shows results of the EPA's toxicity leaching characteristic procedure for a fly ash mixture of 40% incinerator fly ash and 60% coal fly ash before and after the alkaline activation process. The results displayed in FIG. 2 show that the alkaline activation process also reduces the leachability of the fly ash mixture.

Figure 3:
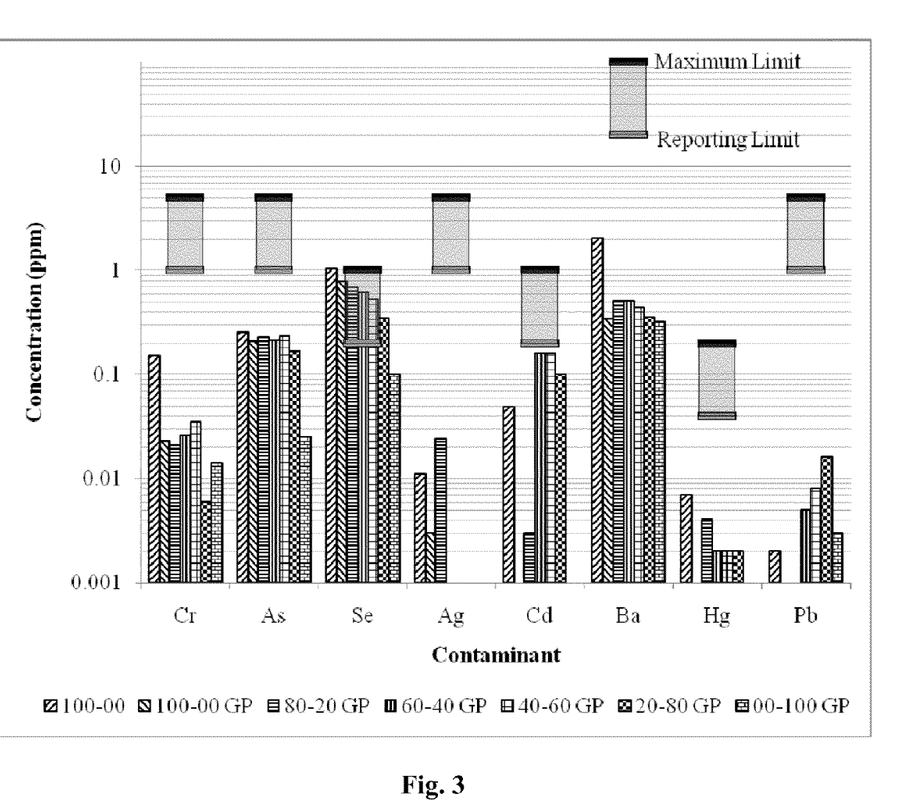
FIG. 3 is a graphical representation of leaching test results for a 100% incinerator fly ash sample and geopolymer paste samples of each other fly ash sample, namely, 80% incinerator fly ash and 20% coal fly ash, 60% incinerator fly ash and 40% coal fly ash, 40% incinerator fly ash and 60% coal fly ash, 20% incinerator fly ash and 80% coal fly ash, and 100% coal fly ash.
Figure 4:
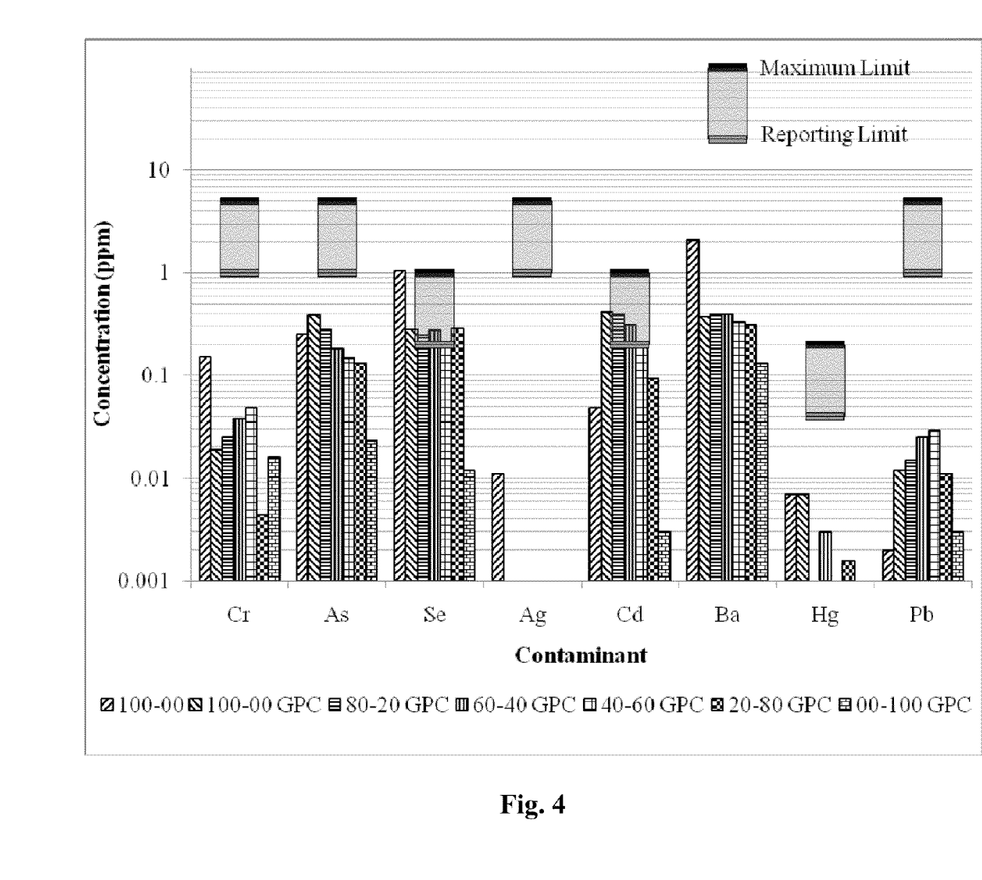
FIG. 4 is a graphical representation of leaching test results for a 100% incinerator fly ash sample and geopolymer concrete samples of each other fly ash sample, namely, 80% incinerator fly ash and 20% coal fly ash, 60% incinerator fly ash and 40% coal fly ash, 40% incinerator fly ash and 60% coal fly ash, 20% incinerator fly ash and 80% coal fly ash, and 100% coal fly ash.

FIGS. 3 and 4 show the results of the leaching tests for a 100% incinerator fly ash sample and the geopolymer paste and geopolymer concrete samples of each other fly ash sample, including a 100% coal fly ash sample, and the incinerator fly ash and coal fly ash mixture samples discussed above. FIG. 3 shows that the leaching levels of chromium, selenium, silver, barium, and mercury were significantly reduced in the geopolymer paste samples, but the leaching levels of arsenic, cadmium, and lead showed little to no reduction, and some of the samples even showed an increase in the concentration of these components. FIG. 4 shows the same tendency for the geopolymer concrete samples, where the levels of chromium, selenium, silver, barium, and mercury show an even greater reduction. The increase in the leaching levels of cadmium and lead for the geopolymer paste and geopolymer concrete samples are still well below the recommended reporting limit set by the EPA. Values above the maximum limits result in the classification of the material as a hazardous waste by the EPA. Values below the minimum reporting limit are considered to be within typical values found in rocks and soils, thus being classified as non-hazardous. Most of the values reported for the geopolymer paste and geopolymer concrete samples are below the reporting limits as shown in FIGS. 3 and 4. The leaching test results show that there is an overall reduction of the toxicity of the incinerator fly ash after the activation process.

Mechanical Strength:

Setting time measurements were taken of fresh geopolymer paste samples using a standard Vicat needle. Compressive strength, elastic modulus, Poisson's ratio, and flexural strength tests were performed on the geopolymer concrete samples. For testing, the geopolymer paste samples were cast into 15 cm by 30 cm cylindrical molds for testing per ASTM C 39 for compressive strength and ASTM C 469 for static elastic modulus and Poisson's ratio testing of the geopolymer concrete samples. The geopolymer paste samples were also cast into 10 cm by 10 cm by 40 cm rectangular prism molds for flexural strength testing of the geopolymer concrete samples per ASTM C 78.

Table 1 includes a summary of the mechanical characterization of the geopolymer concrete formed of incinerator fly ash, coal fly ash, and each of the fly ash mixtures. The coal fly ash geopolymer concrete had the highest measured compressive strength, flexural strength, and elastic modulus, while the incinerator fly ash geopolymer concrete had the lowest measured values for these properties. The values for each of these properties in the geopolymer concrete samples formed of the four fly ash mixtures were within the range between the lowest values for the incinerator fly ash geopolymer concrete and the highest values for the coal fly ash geopolymer concrete. Thus, the mechanical strength of the geopolymer concrete decreased with the increase in the percentage of incinerator fly ash in the fly ash mixture. This may be attributed to the lower silica and alumina content of the incinerator fly ash, leading to the formation of less geopolymer. Also, with increased percentages of incinerator fly ash, the liquid demand increases resulting in larger void systems in the geopolymer. The void systems decrease the strength of the geopolymer concrete. The mechanical strength exhibited by the incinerator fly ash samples can be attributed in part to the formation of calcite during the alkaline activation process.

Table 3 below shows that the content of calcite increased after the alkaline activation process. Calcite can contribute to strength enhancement of the matrix.

TABLE 1

| Sample | Compressive Strength (MPa) | Flexural Strength (MPa) | Elastic Modulus (MPa) | Poisson's Ratio | Setting Time (min) |
|---|---|---|---|---|---|
| Incinerator Fly Ash | 10.07 | 1.04 | 5743 | 0.16 | 3 |
| 80% Incinerator Fly Ash/20% Coal Fly Ash | 15.80 | 1.62 | 8267 | 0.15 | 4 |
| 60% Incinerator Fly Ash/40% Coal Fly Ash | 17.63 | 2.75 | 12286 | 0.09 | 22 |
| 40% Incinerator Fly Ash/60% Coal Fly Ash | 28.69 | 3.47 | 17678 | 0.18 | 100 |
| 20% Incinerator Fly Ash/80% Coal Fly Ash | 34.34 | 3.52 | 23304 | 0.12 | 245 |
| Coal Fly Ash | 57.98 | 5.25 | 28854 | 0.13 | 360 |

The measured Poisson's ratio values for each of the geopolymer concrete samples fell within the range for ordinary concrete (0.11 to 0.20). With increased percentages of incinerator fly ash, the setting time for the geopolymer concrete samples decreased. This may be attributed to the introduction of CaO contained in the incinerator fly ash, which forms hydration products parallel to the formation of the geopolymer. The calcium hydration products formed seed the material and simultaneously increase the alkalinity of the system, accelerating the geopolymerization and accelerating the setting time.

Chemical Composition:

Chemical analysis was performed on each fly ash sample via X-ray fluorescence following ASTM standard D 4326 using a Thermo Scientific ARL Quant'x Energy-Dispersive XRF Spectrometer. The chemical composition of incinerator fly ash, coal fly ash, and the four fly ash mixtures are shown in Table 2.

TABLE 2

| | % Incinerator Fly Ash - % Coal Fly Ash | | | | | |
|---|---|---|---|---|---|---|
| | 100-0 | 80-20 | 60-40 | 40-60 | 20-80 | 0-100 |
| $SiO_2$ | 3.37 | 15.12 | 26.87 | 38.62 | 50.37 | 62.12 |
| $Al_2O_3$ | 1.69 | 5.27 | 8.85 | 12.43 | 16.01 | 19.59 |
| CaO | 39.43 | 32.55 | 25.66 | 18.78 | 11.89 | 5.01 |
| $Fe_2O_3$ | 1.04 | 2.21 | 3.37 | 4.54 | 5.71 | 6.88 |
| MgO | 1.02 | 1.25 | 1.48 | 1.72 | 1.95 | 2.18 |
| $SO_3$ | 2.94 | 2.39 | 1.85 | 1.30 | 0.76 | 0.21 |
| $Na_2O$ | 2.88 | 2.48 | 2.08 | 1.68 | 1.28 | 0.88 |
| $K_2O$ | 2.65 | 2.40 | 2.14 | 1.88 | 1.63 | 1.37 |
| $TiO_2$ | 0.57 | 0.66 | 0.75 | 0.83 | 0.92 | 1.01 |
| $MnO_2$ | 0.05 | 0.07 | 0.09 | 0.12 | 0.14 | 0.16 |
| $P_2O_5$ | 9.47 | 7.60 | 5.72 | 3.84 | 1.97 | 0.09 |
| SrO | 0.08 | 0.11 | 0.13 | 0.15 | 0.18 | 0.20 |
| BaO | 0.05 | 0.08 | 0.11 | 0.14 | 0.17 | 0.20 |
| Cl | 16.32 | 13.06 | 9.79 | 6.53 | 3.26 | |
| Moisture content | 0.00 | 0.03 | 0.07 | 0.10 | 0.14 | 0.17 |
| Loss on Ignition | 15.73 | 12.60 | 9.48 | 6.35 | 3.23 | 0.10 |

The silica and alumina content in the incinerator fly ash was relatively low, 3.37 and 1.69%, respectively. The calcium content in the incinerator fly ash, however, was 39.43%. On the other hand, coal fly ash exhibited silica and alumina contents of 62.12 and 19.59%, respectively, but its calcium content was 5.01%. While silica and alumina are the basic ingredients for the geopolymeric reaction, the coexistence of calcium silicate hydrates, which result from the hydration of CaO, and geopolymer has been reported. It is believed that, while the geopolymer chains are forming, calcium reacts with the silicate and aluminate monomers from the source material to form calcium silicate hydrates and calcium aluminosilicate hydrates. Incinerator fly ash showed a loss on ignition of 15.73% and coal fly ash showed a loss on ignition of 0.10%.

present in smaller amounts, namely, quartz and sylvite. The analysis also shows that coal fly ash was also predominantly amorphous, with quartz as the main crystalline phase, and mullite and magnetite found in smaller amounts. The values in Table 3 for the four fly ash mixture samples were calculated from the values for incinerator fly ash and coal fly ash. Because bonds between molecules are stronger and more stable in a crystalline structure compared to an amorphous structure, amorphous material is more easily dissolved and yields higher amounts of silica and alumina from the source material during the first step of geopolymerization.

TABLE 3

| Phase | % Incinerator Fly Ash - % Coal Fly Ash | | | | | | | | | | | |
|---|---|---|---|---|---|---|---|---|---|---|---|---|
| | 100-0 | | 80-20 | | 60-40 | | 40-60 | | 20-80 | | 0-100 | |
| | FA | GP | FA | GP | FA | GP | FA | GP | FA | GP | FA | GP |
| Anhydrite $CaSO_4$ | 2.00 | | 1.60 | | 0.96 | | 0.38 | | 0.08 | | | |
| Anorthite $CaAl_2Si_2O_8$ | 3.00 | | 2.40 | | 1.44 | | 0.58 | | 0.12 | | | |
| Calcite $CaCO_3$ | 3.00 | 7.30 | 2.40 | 5.84 | 1.44 | 3.50 | 0.58 | 1.40 | 0.12 | 0.28 | | |
| Gehlenite $Ca_2Al_2SiO_7$ | 4.00 | | 3.20 | | 1.92 | | 0.77 | | 0.15 | | | |
| Hematite $Fe_2O_3$ | | | | 0.01 | | 0.04 | | 0.10 | | 0.16 | | 0.20 |
| Ellestadite $Ca_5(SiO_4, PO_4, SO_4)$ | 6.00 | 6.90 | 4.80 | 5.52 | 3.60 | 4.14 | 2.40 | 2.76 | 1.20 | 1.38 | | |
| Halite NaCl | 3.00 | 7.50 | 2.40 | 6.00 | 1.80 | 4.50 | 1.20 | 3.00 | 0.60 | 1.50 | | |
| Magnetite $Fe_3O_4$ | | | 0.20 | 0.16 | 0.40 | 0.32 | 0.60 | 0.48 | 0.80 | 0.64 | 1.00 | 0.80 |
| Mullite $Al_{4.5}Si_{1.5}O_{9.75}$ | | | 1.40 | 0.96 | 2.08 | 1.92 | 3.12 | 2.88 | 4.16 | 3.84 | 5.20 | 4.80 |
| Quartz $SiO_2$ | 0.50 | 0.30 | 4.54 | 2.68 | 8.58 | 5.06 | 12.62 | 7.44 | 16.66 | 9.82 | 20.70 | 12.20 |
| Sylvite KCl | 0.20 | | 0.16 | | 0.12 | | 0.08 | | 0.04 | | | |
| $Na_2CO_3$ | 1.00 | | 0.80 | | 0.60 | | 0.40 | | 0.20 | | | |
| Amorphous | 77.30 | 78.00 | 76.46 | 78.80 | 75.62 | 79.60 | 74.78 | 80.40 | 73.94 | 81.20 | 73.10 | 82.00 |

Loss on ignition is a determinant factor in assessing the potential for alkaline activation of a fly ash. Specifically, a fly ash having a high loss on ignition value requires a higher amount of alkaline activator liquid to activate the fly ash source material, resulting in a high rate of network disruption by the excess water and low mechanical strength.

X-Ray Diffraction:

X-ray diffraction analysis was performed on each fly ash sample and each geopolymer paste sample using a Bragg-Brentano geometry power diffractometer using a 40 kV capacity copper anode. For the data collection, the theta angle selected was in the range of 10 and 80°, with 0.5° step size, over a count time of 5 seconds per step. The amounts of crystalline and amorphous components were also determined by using Rietveld phase quantification method.

Figure 5:
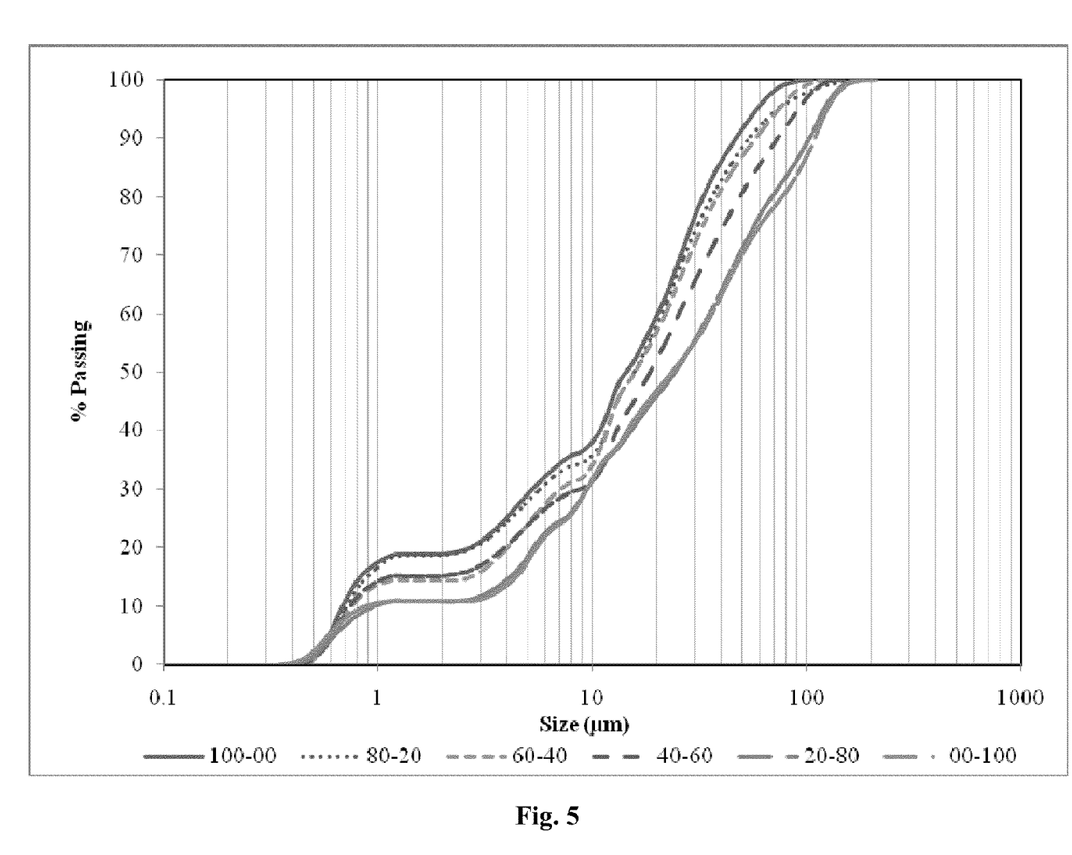
FIG. 5 is a graphical representation of particle size distribution curves for incinerator fly ash, coal fly ash, and each other fly ash sample, namely, 80% incinerator fly ash and 20% coal fly ash, 60% incinerator fly ash and 40% coal fly ash, 40% incinerator fly ash and 60% coal fly ash, and 20% incinerator fly ash and 80% coal fly ash.

Table 3 shows qualitative and quantitative analysis results for incinerator fly ash, coal fly ash, and the four fly ash mixture samples, along with the results for the geopolymer paste of each fly ash sample. The analysis shows that incinerator fly ash is predominantly amorphous with a small percentage of calcium and sodium based crystalline phases, such as calcite, halite, and anhydrate. Other crystalline phases are Particle Size Distribution:

Particle size distribution analysis was performed on each fly ash sample using Microtrac S3500 laser-based equipment by suspension of the samples in isopropyl alcohol. FIG. 5 shows particle size distribution curves for incinerator fly ash, coal fly ash, and the four mixed fly ash samples. Approximately 89% of the particles in the incinerator fly ash were smaller than 45 micrometers, while this number was 67% in coal fly ash. The four fly ash mixture samples are within these values according to the proportion of each fly ash.

Figure 6:
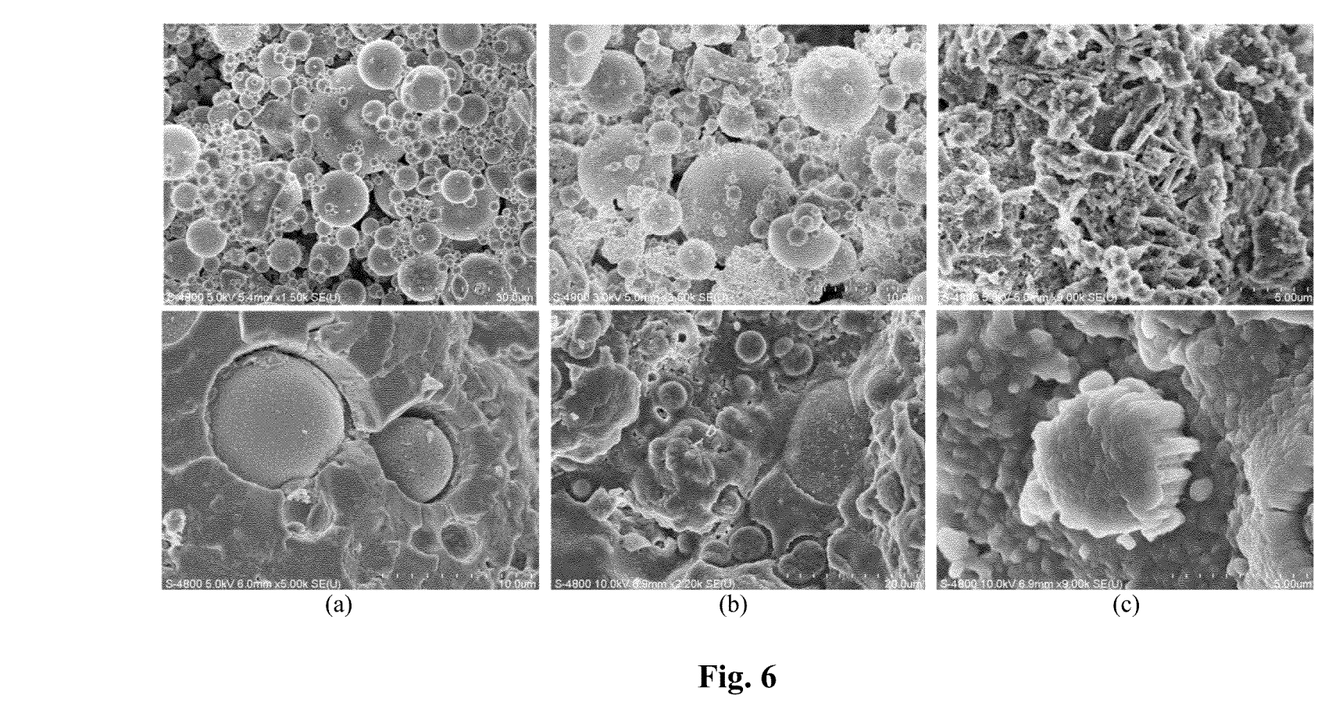

SEM Analysis:

Scanning electron microscopy was performed on each fly ash sample and each geopolymer paste sample to show the ash particles before and after a reaction with the alkaline activator solution. FIG. 6 shows SEM images of (a) a coal fly ash sample, (b) a fly ash mixture sample containing 60% incinerator fly ash and 40% coal fly ash, and (c) an incinerator fly ash sample, before and after the alkaline activation or geopolymerization process. The morphology of coal fly ash particles is predominantly spherical, while incinerator fly ash exhibits highly disrupted particles with angular and irregular shapes. The image of coal fly ash after the activation process shows a geopolymer gel. This image suggests that larger particles (e.g., greater than 20 micrometers) do not react chemically, but become physically embedded in the binder.

The invention claimed is:

1. A composition of matter formed by the mixing of the components comprising:
   about 4% to about 25% by weight incinerator fly ash;
   about 4% to about 20% by weight coal fly ash;
   about 12% to about 19% by weight alkaline activator liquid; and
   about 58% to about 63% by weight aggregate.

2. The composition of matter of claim 1, wherein said incinerator fly ash is derived from a solid waste incinerator facility.

3. The composition of matter of claim 1, wherein a weight ratio of said incinerator fly ash to said coal fly ash in said composition of matter is in the range of about 0.25 to about 4.

4. The composition of matter of claim 1, wherein said alkaline activator liquid comprises a sodium hydroxide solution and a sodium silicate.

5. The composition of matter of claim 4, wherein a concentration of sodium hydroxide in said sodium hydroxide solution is in the range of approximately 12 M to approximately 14 M.

6. The composition of matter of claim 4, wherein a concentration of said sodium silicate in said alkaline activator liquid is in the range of approximately 44% to approximately 46% by weight.

7. The composition of matter of claim 4, wherein a weight ratio of said sodium hydroxide solution to said sodium silicate in said alkaline activator liquid is in the range of approximately 0.8 to approximately 1.

8. The composition of matter of claim 4, wherein a $SiO_2$ to $Na_2O$ ratio of said sodium silicate is in the range of approximately 1.8 to approximately 2.2.

9. The composition of matter of claim 1, wherein said aggregate comprises a coarse aggregate and a fine aggregate with a fine aggregate to coarse aggregate weight ratio in the range of approximately 1 to approximately 3.

10. The composition of matter of claim 1, further comprising a water reducing agent.

11. The composition of matter of claim 10, wherein said water reducing agent comprises a polycarboxylate-based water reducing agent.

* * * * *